No. 794,114. PATENTED JULY 4, 1905.
W. E. POESE.
FEEDER FOR SELF BINDING HARVESTERS.
APPLICATION FILED JAN. 16, 1905.
2 SHEETS—SHEET 2.
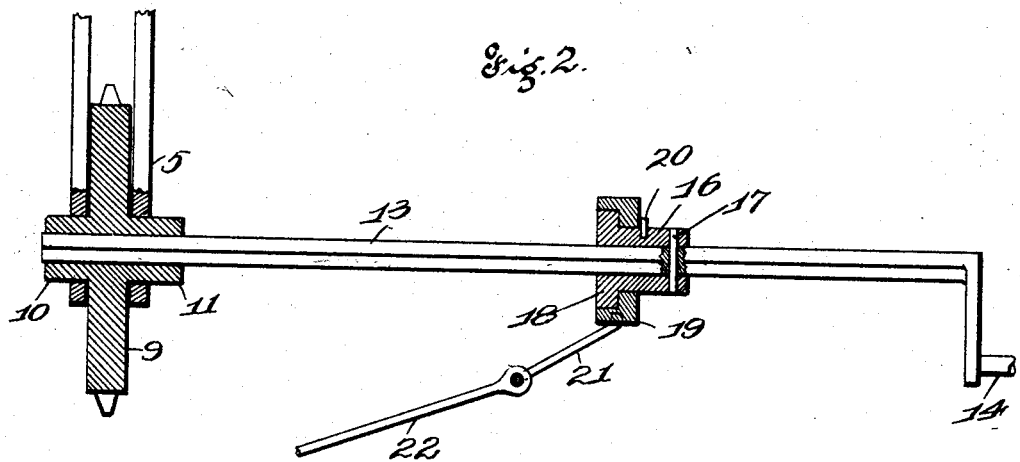
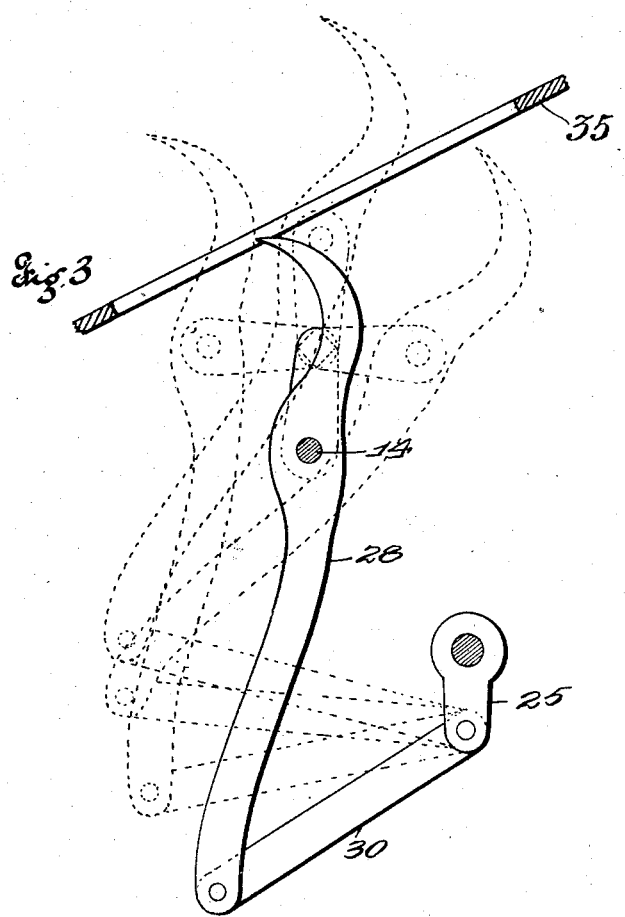

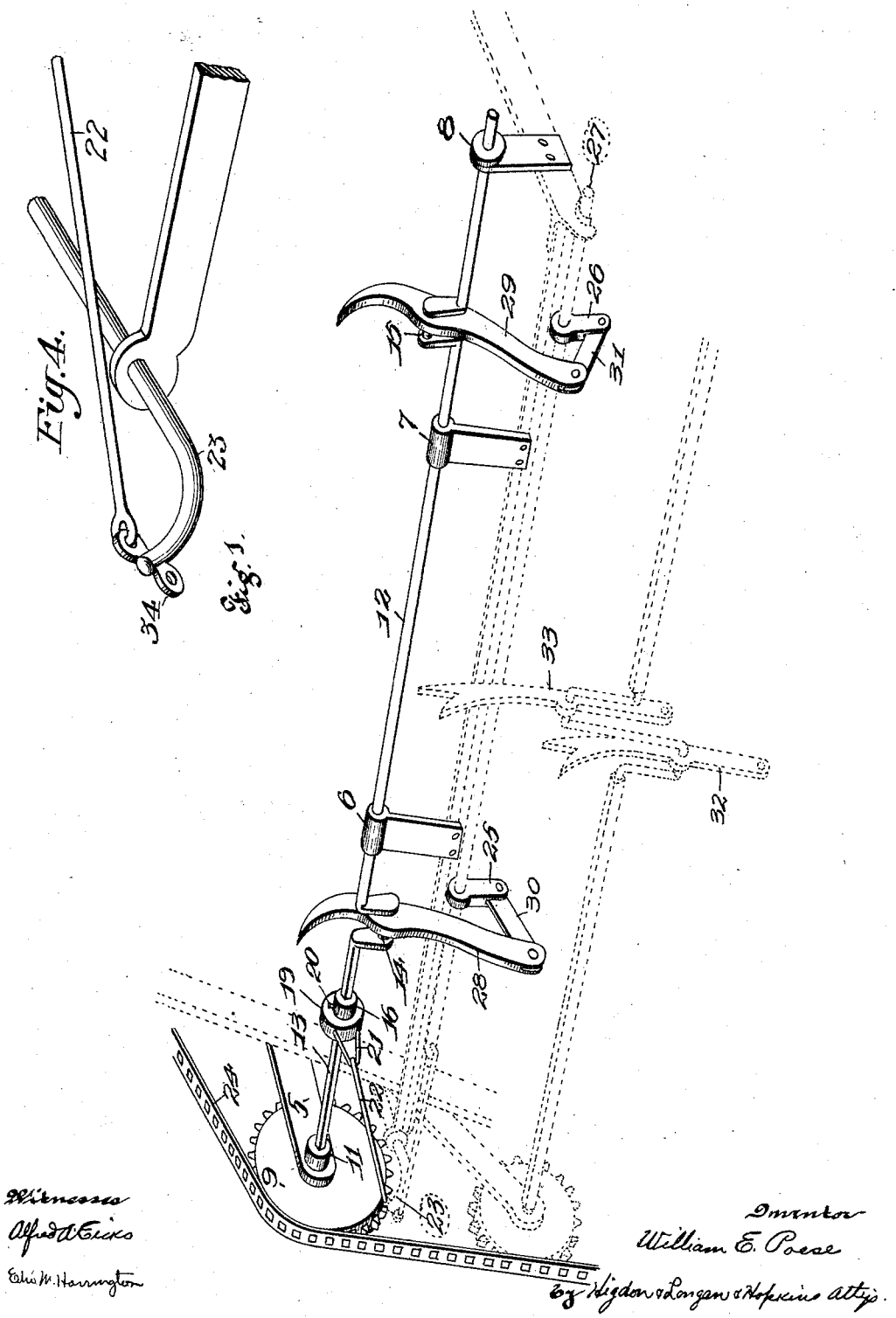

No. 794,114. Patented July 4, 1905.

UNITED STATES PATENT OFFICE.

WILLIAM E. POESE, OF PATTONVILLE, MISSOURI.

FEEDER FOR SELF-BINDING HARVESTERS.

SPECIFICATION forming part of Letters Patent No. 794,114, dated July 4, 1905.

Application filed January 16, 1905. Serial No. 241,302.

*To all whom it may concern:*

Be it known that I, WILLIAM E. POESE, a citizen of the United States, and a resident of Pattonville, St. Louis county, Missouri, have invented certain new and useful Improvements in Feeders for Self-Binding Harvesters, of which the following is a specification containing a full, clear, and exact description, reference being had to the accompanying drawings, forming a part hereof.

My invention relates to improvements in feeders for self-binding harvesters; and it consists of the novel features herein shown, described, and claimed.

In the drawings, Figure 1 is a perspective showing the self-binder in dotted lines and showing my improvements in full lines. Fig. 2 is a longitudinal sectional detail upon an enlarged scale. Fig. 3 is a cross-section, upon an enlarged scale, illustrating the motion of the feeder-arms. Fig. 4 is a detail perspective view of the feeder-shifting crank and its connections.

The object of my invention is to provide improved means for feeding the grain upon the binder-deck so as to obviate the choking which has heretofore occurred in self-binders of this class.

The feeder-arms heretofore have usually been arranged to engage the bundle of grain at about the center of its length, and it frequently happened that said feeder-arms were inadequate to properly feed the grain and the same became tangled and choked the machine. By the use of my attachment the butts and heads are fed at the same time that the centers are fed, and my feeder-arms move up and down longitudinally of the grain, and the result is a comparatively straight bundle.

Referring to the drawings in detail, bearing-blocks 5, 6, 7, and 8 are rigidly mounted upon the frame of the self-binder, said bearing-block 5 being bifurcated. The sprocket-wheel 9 is mounted between the two parts of the bearing-block 5, with the hubs 10 and 11 of the sprocket-wheel extending through the said two parts. The crank-shaft 12 is rotatably mounted in the bearing-blocks 6, 7, and 8, and the other end of the shaft is squared, as indicated by 13, and slidingly mounted in the square opening through the wheel 9. A crank 14 is formed in the crank-shaft near the square end, and a similar crank 15 is formed in the other end, said cranks being set in opposite directions, so that when one is up the other is down. A sleeve 16 is fixed upon the shaft 12 and upon the squared portion, said sleeve being held from endwise movement by the pin 17. A flange 18 extends outwardly from one end of the sleeve, and the bearing 19 is rotatably mounted upon the sleeve against the flange, said bearing being held in place by the pin 20. A link 21 is attached to the bearing 19, and the rod 22 connects the link to the crank 23, said crank being a part of the self-binder before my attachment is applied, so as to reciprocate the crank-shaft 12 by the operation of the crank 23. The driving-chain 24, which operates the self-binder, is lengthened, so as to pass around and drive the sprocket-wheel 9. Crank-arms 25 and 26 are fixed upon the reciprocating rod 27 of the self-binder and extend downwardly. Feeding-arms 28 and 29 are mounted upon the cranks 14 and 15, and links 30 and 31 connect the lower ends of the feeder-arms to the cranks 25 and 26, so that the upper ends of the feeder-arms vibrate, as shown in dotted lines of Fig. 3, when the crank-shaft is rotated. The feeder-arms 28 and 29 are located one upon each side of the feeder-arms 32 and 33, so as to feed and pack the heads and butts of the grain. The feeder-arms 32 and 33 are shown in dotted lines to indicate the feeder-arms usually found upon the self-binder, and these arms separate at what should be the center of the bundle of grain, and it frequently happens that the grain is bent double by these feeder-arms, and the result is a tangled mass. 35 indicates the bundle-deck.

By moving the crank 23 the crank-shaft 12, carrying the feeder-arms 28 and 29, will be moved a corresponding distance by reason of the rod 22 being connected to said crank 23, and the said feeder-arms will thereby be made to engage the bundle of grain at any desired point. Another rod (shown in dotted lines) similar in construction to rod 22 is arranged, as heretofore, with one of its ends connected to an eye 34, carried by said crank 23 and connected to the reciprocating shaft 27. The position of the feeder-arms 28 and 29 may be adjusted in the usual manner by rocking the said shaft 27.

I claim—

1. In a feeder for self-binding harvesters; the combination with the binder-deck, of the regular feeders for engaging bundles about midway of their length; a crank-shaft rotatably and slidingly mounted; means for driving the crank-shaft, and a series of feeders mounted upon said crank-shaft and arranged to engage the bundles at a point on either side of said regular feeders; substantially as specified.

2. In a feeder for self-binding harvesters; the combination with the binder-deck of the regular feeders for engaging bundles about midway of their length; a crank-shaft rotatably and slidingly mounted; the cranks being upon opposite sides of said regular feeders; and means for rotating and reciprocating the crank-shaft; feeder-arms upon the cranks; and link connections between the feeder-arms and the frame of the self-binder; substantially as specified.

In testimony whereof I have signed my name to this specification in presence of two subscribing witnesses.

WILLIAM E. POESE.

Witnesses:
ALFRED A. EICKS,
JOHN C. HIGDON.